(12) United States Patent
Zierer et al.

(10) Patent No.: US 12,525,851 B2
(45) Date of Patent: Jan. 13, 2026

(54) COOLING A STATOR HOUSING OF AN ELECTRIC MACHINE

(71) Applicant: General Electric Company, Schenectady, NY (US)

(72) Inventors: Joseph John Zierer, Niskayuna, NY (US); Brian Magann Rush, Niskayuna, NY (US); Karthik K. Bodla, Fremont, CA (US); Andrew Thomas Cross, Waterford, NY (US); Vandana Prabhakar Rallabandi, Niskayuna, NY (US); Konrad Roman Weeber, Saratoga Springs, NY (US); Anoop Kumar Jassal, Aarhus (DK)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/753,464

(22) Filed: Jun. 25, 2024

(65) Prior Publication Data

US 2024/0348130 A1    Oct. 17, 2024

Related U.S. Application Data

(62) Division of application No. 17/390,009, filed on Jul. 30, 2021, now Pat. No. 12,040,690.

(Continued)

(51) Int. Cl.
*H02K 9/20* (2006.01)
*H02K 1/16* (2006.01)
(Continued)

(52) U.S. Cl.
CPC .............. *H02K 9/20* (2013.01); *H02K 1/165* (2013.01); *H02K 1/20* (2013.01); *H02K 3/12* (2013.01);
(Continued)

(58) Field of Classification Search
CPC .. H02K 9/20; H02K 1/20; H02K 3/12; H02K 3/24; H02K 5/18; H02K 5/203;
(Continued)

(56) References Cited

U.S. PATENT DOCUMENTS

| 4,366,526 A | 12/1982 | Lijoi et al. |
| 4,419,044 A | 12/1983 | Barry et al. |

(Continued)

FOREIGN PATENT DOCUMENTS

| CN | 104776740 A | 7/2015 |
| CN | 205602145 U | 9/2016 |

(Continued)

OTHER PUBLICATIONS

Ameli et al., A Novel Method for Manufacturing Sintered Aluminum Heat Pipes (SAHP), Applied Thermal Engineering, vol. 52, Issue 2, Apr. 15, 2013, pp. 498-504.

(Continued)

*Primary Examiner* — Donghai D Nguyen
(74) *Attorney, Agent, or Firm* — Dority & Manning, P.A.

(57) ABSTRACT

An electric motor may include a stator assembly comprising a stator housing, and one or more rotors coupled to the stator by a rotor shaft assembly. The stator housing may include a cooling structure that has a plurality of cooling body portions and a plurality of cooling conduits defined by the plurality of cooling body portions. A method of forming a stator housing for an electric machine may include additively manufacturing a stator housing that includes a cooling structure defining a fluid domain, coupling a working fluid source to the stator housing and introducing a working fluid into the fluid domain defined by the cooling structure, and sealing the cooling structure with the working fluid contained within the fluid domain of the cooling structure. A method of cooling an electric machine may include heating (Continued)

the working fluid in the fluid domain and flowing the working fluid through the fluid domain, and transferring heat from the cooling structure to a cooling fluid flowing along one or more cooling surfaces contacting a surface of the electric machine.

20 Claims, 13 Drawing Sheets

Related U.S. Application Data

(60) Provisional application No. 63/072,432, filed on Aug. 31, 2020.

(51) Int. Cl.
| | | |
|---|---|---|
| *H02K 1/20* | (2006.01) | |
| *H02K 3/12* | (2006.01) | |
| *H02K 3/24* | (2006.01) | |
| *H02K 5/18* | (2006.01) | |
| *H02K 5/20* | (2006.01) | |

(52) U.S. Cl.
CPC .............. *H02K 3/24* (2013.01); *H02K 5/18* (2013.01); *H02K 5/203* (2021.01)

(58) Field of Classification Search
CPC ...... H02K 1/16; H02K 9/19; F28D 2021/004; F28D 15/0275; F28D 15/046; F28F 2215/10; B33Y 80/00; Y10T 29/49009
See application file for complete search history.

(56) References Cited

U.S. PATENT DOCUMENTS

| | | |
|---|---|---|
| 4,771,365 A | 9/1988 | Cichocki et al. |
| 5,227,957 A | 7/1993 | Deters |
| 5,439,351 A | 8/1995 | Artt |
| 5,579,830 A | 12/1996 | Giammaruti |
| 5,975,841 A | 11/1999 | Lindemuth et al. |
| 6,233,150 B1 | 5/2001 | Lin et al. |
| 6,237,223 B1 | 5/2001 | McCullough |
| 6,269,866 B1 | 8/2001 | Yamamoto et al. |
| 6,359,218 B1 | 3/2002 | Koch et al. |
| 6,392,883 B1 | 5/2002 | Ali |
| 6,430,931 B1 | 8/2002 | Homer |
| 6,624,349 B1 | 9/2003 | Bass |
| 6,631,755 B1 | 10/2003 | Kung et al. |
| 6,648,063 B1 | 11/2003 | Andraka et al. |
| 6,703,729 B2 * | 3/2004 | Weeber .................. H02K 9/18 310/58 |
| 7,002,247 B2 | 2/2006 | Mok et al. |
| 7,189,064 B2 | 3/2007 | Heider et al. |
| 7,256,992 B1 | 8/2007 | Stewart et al. |
| 7,369,410 B2 | 5/2008 | Chen et al. |
| 7,377,098 B2 | 5/2008 | Walker et al. |
| 7,473,995 B2 | 1/2009 | Rumer et al. |
| 7,594,537 B2 | 9/2009 | Hou et al. |
| 7,675,209 B2 | 3/2010 | Masoudipour et al. |
| 7,900,438 B2 | 3/2011 | Venkataramani et al. |
| 7,928,562 B2 | 4/2011 | Arvelo et al. |
| 8,047,269 B2 | 11/2011 | Kang et al. |
| 8,176,972 B2 | 5/2012 | Mok |
| 8,283,818 B2 | 10/2012 | Hassett et al. |
| 8,378,534 B2 | 2/2013 | Houle et al. |
| 8,427,018 B2 | 4/2013 | Dutau et al. |
| 8,466,486 B2 | 6/2013 | Yuan |
| 8,475,112 B1 | 7/2013 | Ryznic et al. |
| 8,549,749 B2 | 10/2013 | Zimbeck et al. |
| 8,616,834 B2 | 12/2013 | Knight, III et al. |
| 8,656,722 B2 | 2/2014 | Norris et al. |
| 8,937,384 B2 | 1/2015 | Bao et al. |
| 9,225,224 B2 | 12/2015 | Memminger et al. |
| 9,246,370 B2 * | 1/2016 | Hossain ................. H02K 9/223 |
| 9,356,492 B2 | 5/2016 | Chamberlin et al. |
| 9,476,651 B2 | 10/2016 | Thiagarajan et al. |
| 9,698,653 B2 * | 7/2017 | Stiesdal ................... H02K 1/20 |
| 10,660,236 B2 | 5/2020 | Rush et al. |
| 10,784,746 B2 * | 9/2020 | Bodla ..................... H02K 15/10 |
| 2002/0021556 A1 | 2/2002 | Dibene et al. |
| 2003/0043547 A1 | 3/2003 | Nealis |
| 2005/0050877 A1 | 3/2005 | Venkataramani et al. |
| 2005/0280162 A1 | 12/2005 | Mok et al. |
| 2006/0042224 A1 | 3/2006 | Shiao et al. |
| 2007/0012429 A1 | 1/2007 | Siu |
| 2007/0193723 A1 | 8/2007 | Hou et al. |
| 2008/0053640 A1 | 3/2008 | Mok |
| 2008/0170368 A1 | 7/2008 | Chen et al. |
| 2009/0040726 A1 | 2/2009 | Hoffman et al. |
| 2009/0244830 A1 | 10/2009 | Wyatt et al. |
| 2010/0006132 A1 | 1/2010 | Hodes |
| 2010/0065256 A1 | 3/2010 | Wilcoxon |
| 2010/0200199 A1 | 8/2010 | Habib et al. |
| 2010/0320187 A1 | 12/2010 | Griffin et al. |
| 2011/0209864 A1 | 9/2011 | Figus et al. |
| 2011/0232877 A1 | 9/2011 | Meyer, IV et al. |
| 2011/0309699 A1 | 12/2011 | Woolmer et al. |
| 2012/0020017 A1 | 1/2012 | Kehret et al. |
| 2012/0192574 A1 | 8/2012 | Ghoshal et al. |
| 2012/0227926 A1 | 9/2012 | Field et al. |
| 2012/0250259 A1 | 10/2012 | Lee et al. |
| 2012/0318479 A1 | 12/2012 | Chang et al. |
| 2012/0331269 A1 | 12/2012 | Aras |
| 2013/0187492 A1 | 7/2013 | Woolmer |
| 2013/0189594 A1 | 7/2013 | Breit et al. |
| 2014/0083651 A1 | 3/2014 | Chaix et al. |
| 2014/0083653 A1 | 3/2014 | Kempers et al. |
| 2014/0090808 A1 | 4/2014 | Bessho et al. |
| 2014/0174086 A1 | 6/2014 | Kare et al. |
| 2014/0190667 A1 | 7/2014 | McGlen et al. |
| 2014/0268831 A1 | 9/2014 | Shih et al. |
| 2014/0284020 A1 | 9/2014 | Amir et al. |
| 2015/0027669 A1 | 1/2015 | Kokas et al. |
| 2015/0040888 A1 | 2/2015 | Zakhidov et al. |
| 2016/0285345 A1 | 9/2016 | Adimula et al. |
| 2016/0305279 A1 | 10/2016 | Gerstler et al. |
| 2017/0064868 A1 | 3/2017 | Rush et al. |
| 2017/0067693 A1 | 3/2017 | Rush et al. |
| 2018/0331016 A1 | 11/2018 | Kang |
| 2019/0280536 A1 | 9/2019 | Nijjima |
| 2019/0379257 A1 | 12/2019 | Gerstler et al. |
| 2022/0003128 A1 * | 1/2022 | Osama .................... H02K 37/08 |

FOREIGN PATENT DOCUMENTS

| | | |
|---|---|---|
| CN | 107017728 A | 8/2017 |
| CN | 109904948 A | 6/2019 |
| CN | 208986739 U | 6/2019 |
| CN | 110429727 A | 11/2019 |
| CN | 211018427 U | 7/2020 |
| DE | 2826998 C1 | 6/1995 |
| DE | 102011086786 B3 | 3/2013 |
| GB | 2476253 A | 6/2011 |
| JP | H0621290 A | 1/1994 |
| JP | H10267571 A | 10/1998 |
| JP | 2006014564 A | 1/2006 |
| JP | 2006025573 A | 1/2006 |
| JP | 2006203965 A | 2/2006 |
| JP | 2016220298 A | 12/2016 |
| JP | 2015095961 A | 5/2018 |
| TW | I289655 B | 11/2007 |
| WO | WO2009/120613 A1 | 10/2009 |
| WO | WO2010007385 A2 | 1/2010 |
| WO | WO2013/097031 A2 | 7/2013 |

OTHER PUBLICATIONS

Brown et al., Thermal Management Issues and Evaluation of a Novel, Flexible Substrate, 3-Dimensional (3-D) Packaging Concept, Multichip Modules and High Density Packaging, 1988. Proceedings and International Conferences on Apr. 15-17-1998, Denver, CO, pp. 135-140.

(56) References Cited

OTHER PUBLICATIONS

Extension Media, Engineers' Guide to Military, Aerospace & Avionics, Engineers' Guide to Military, Aerospace & Avionics, 2014, pp. 44.
Green et al., Dynamic Thermal Management of High Heat Flux Devices using Embedded Solid-Liquid Phase Change Materials and Solid State Coolers, $13^{th}$ IEEE Itherm Conference, 2012, pp. 853-863.
Hara et al., Optimization for Chip Stack in 3-D Packaging, IEEE Transactions on Advanced Packaging, vol. 28, Issue 3, Aug. 2005, pp. 367-376.
Mochizuki et al., A Review of Heat Pipe Application Including New Opportunities, Frontiers in Heat Pipes, vol. 2, 2011, pp. 1-15.
Rawal et al., Thermal Management for Multifunctional Structures, Advanced Packaging, IEEE Transactions on Advanced Packaging, vol. 22, Issue 3, Denver CO, Aug. 1999, pp. 379-383.
Robak, Latent Heat Thermal Energy Storage with Embedded Heat Pipes for Concentrating Solar Power Applications, University of Connecticut Digital Commons, Apr. 24, 2012, pp. 1-57.
Subracks, Pixus Technologies, Aug. 24, 2017, pp. 13.
Wu et al., Investigation of the Polymer Wick Structure Applied to Loop Heat Pipe, 2009 $4^{th}$ International Microsystems, Packaging, Assembly and Circuits Technology Conference, Oct. 21-23, 2009, pp. 368-371.
YASA Limited, E-motors and Controllers, 5 Pages. Retrieved on Jul. 14, 2020 from www.YASA.com.
Yogev et al., PCM Storage System with Integrated Active Heat Pipe, Energy Procedia, Science Direct, vol. 49, 2014, pp. 1061-1070.

\* cited by examiner

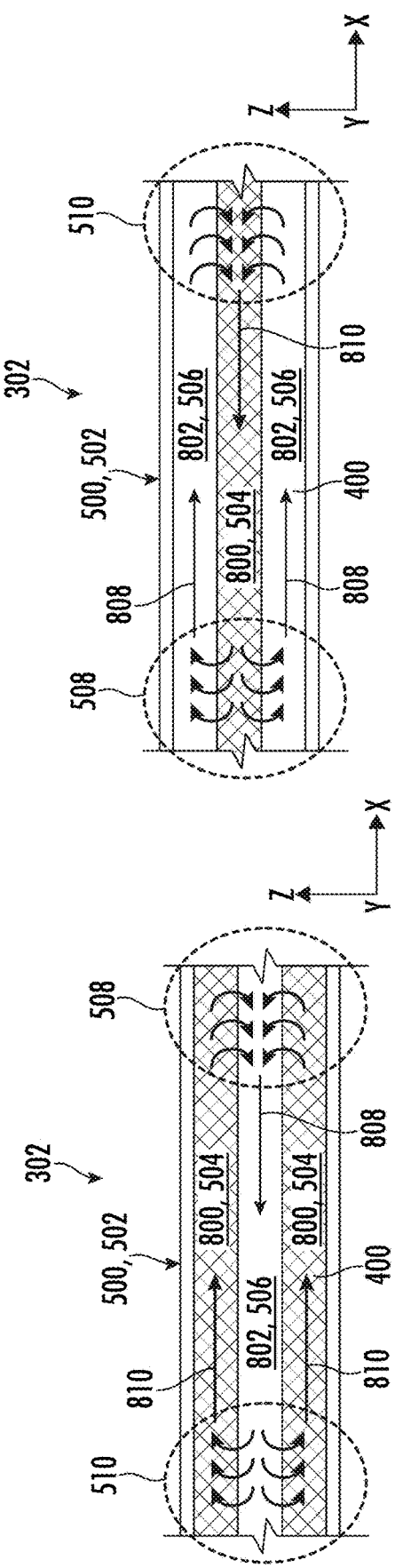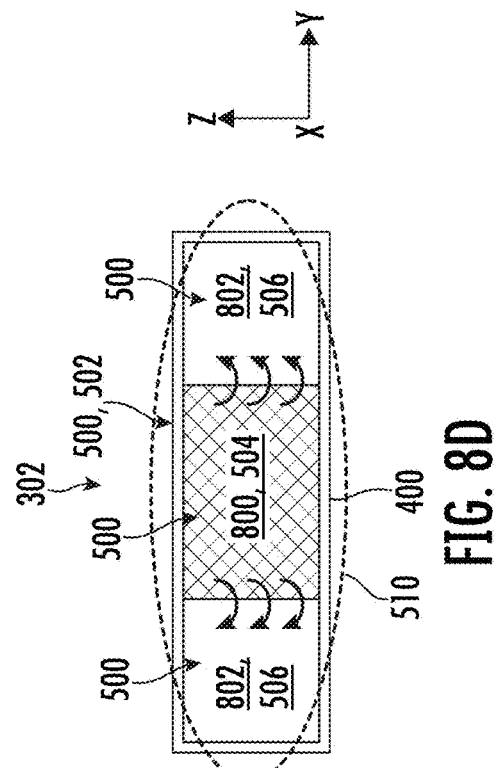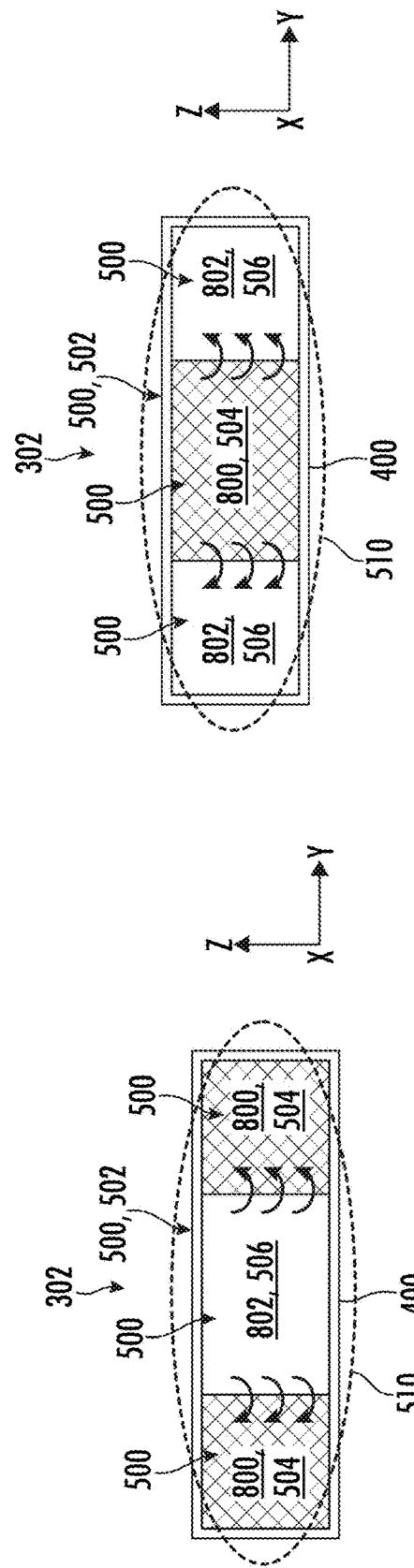

COOLING A STATOR HOUSING OF AN ELECTRIC MACHINE

CROSS-REFERENCE TO RELATED APPLICATIONS

This application claims priority to U.S. Provisional App. Ser. No. 63/072,432, filed Aug. 31, 2020, the contents of which is incorporated herein by reference in its entirety as if set forth verbatim.

FIELD

The present disclosure generally pertains to electric machines, and more particularly to cooling an electric machine.

BACKGROUND

Electric machines include operative elements that generate heat when operating the electric machine. Cooling features may be provided for an electric machine. However, some electric machines may have limited space available for cooling features.

Often the structural and cooling features of an electrical machine design are competing for the same space, adjacent to the force and heat generation components of an electric machine, and a trade-off between power density and performance must be made.

Accordingly, there exists a need for improved electric machines, such as electric machines with improved cooling, as well as improved methods of manufacturing components of an electric machine and improved methods of cooling an electric machine.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 8A-8G schematically depicts exemplary vapor chamber configurations that may be included in a cooling structure of a stator housing;

Figure 1:
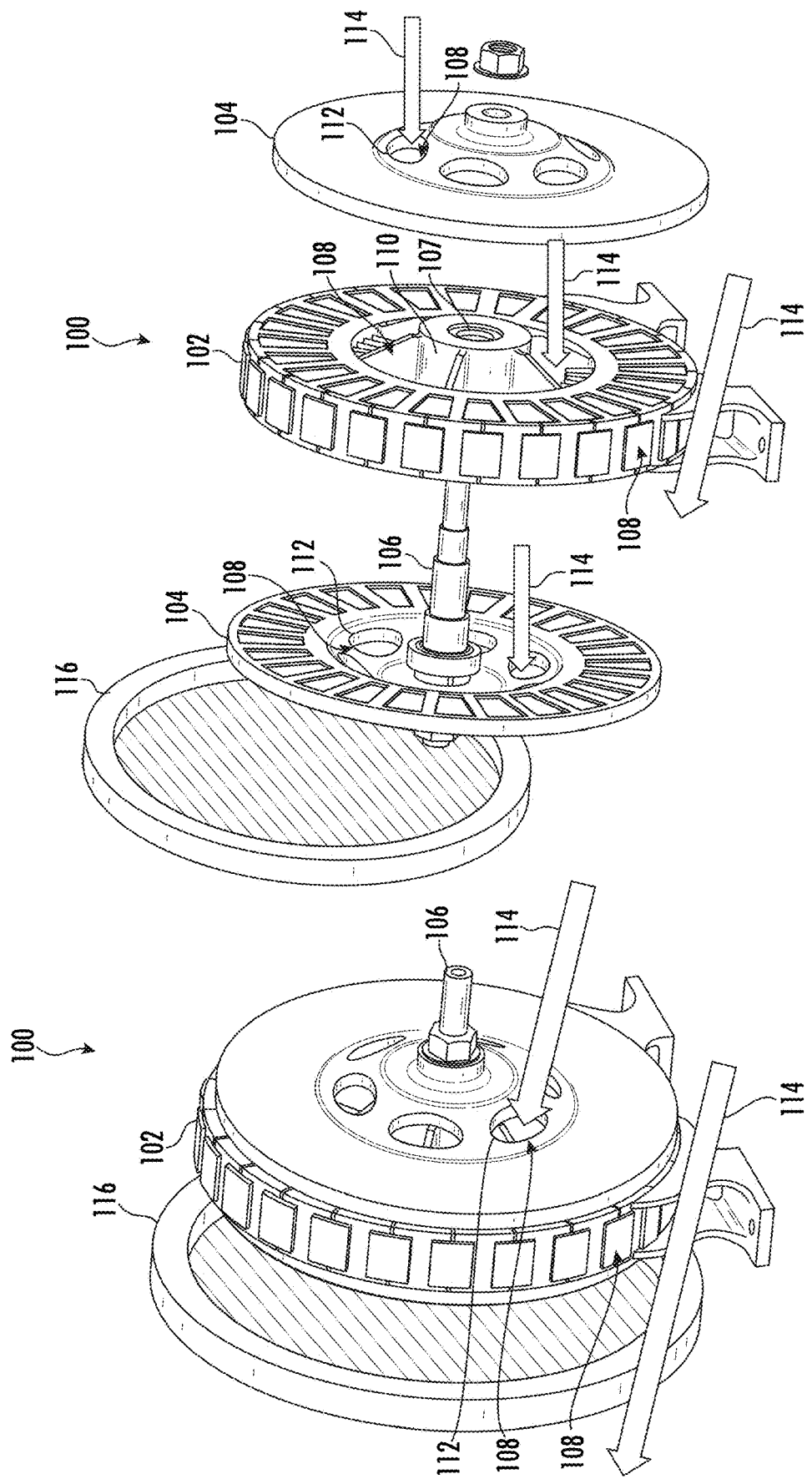
FIG. 1A schematically depicts a perspective view of an exemplary electric machine.
FIG. 1B schematically depicts an exploded perspective view of an exemplary electric machine.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Exemplary embodiments of the present disclosure will now be described in further detail. FIGS. 1A and 1B show an exemplary electric machine 100. The electric machine may include a stator assembly 102, and one or more rotors 104. The one or more rotors 104 may be coupled to the stator assembly 102 by a rotor shaft assembly 106 such as by way of a rotor bearing assembly 107. The electric machine may include one or more cooling surfaces 108, such as one or more stator cooling surfaces 110 and/or one or more rotor cooling surfaces 112, through which cooling fluid 114, such as cooling air, may be caused to flow and thereby cool the electric motor 100. The one or more cooling surfaces 108 may be disposed about a radially inward portion of the electric machine 100, as shown, for example, in FIGS. 1A and 1B. Additionally, or in the alternative, the one or more cooling surfaces 108 may be disposed about a radially outward portion of the electric machine 100. For example, the one or more cooling surfaces may circumferentially surround the electric machine 100. In some embodiments, a circumferential perimeter of the electric machine 100 may define a cooling surface 108. In some embodiments, a cooling jacket 116 may define at least a portion of a cooling pathway for cooling fluid 114 to flow past one or more cooling surfaces 108.

Figure 2:
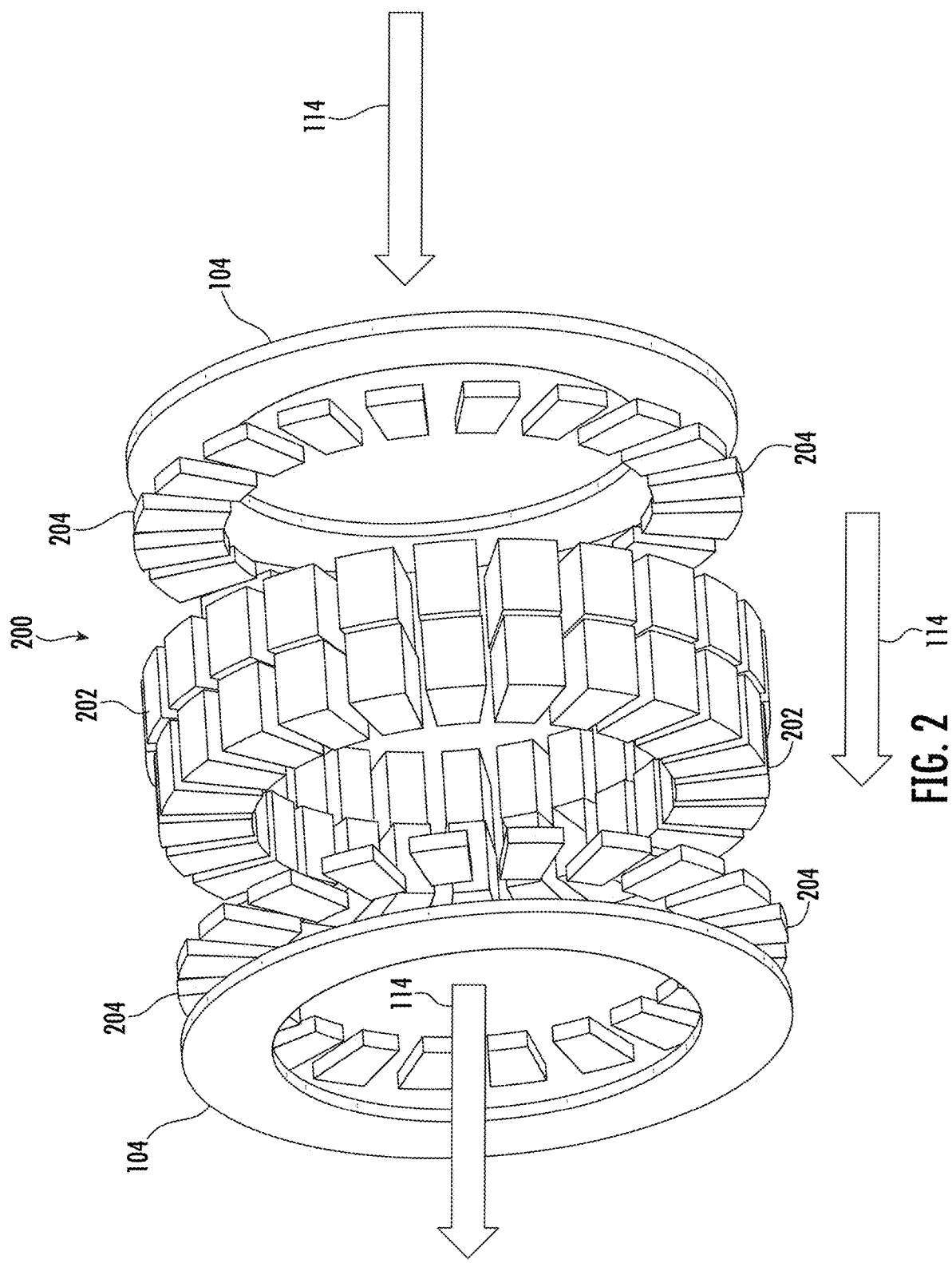
FIG. 2 schematically depicts operative elements of an exemplary electric machine.

As shown in FIG. 2, exemplary operative elements 200 of an electric machine 100 may include a plurality of winding elements 202 and a plurality of magnet elements 204. Heat generated by the operative elements 200 of the electric machine 100 may be transferred to the cooling fluid 114 flowing along the one or more cooling surfaces 108 contacting a surface of the electric machine, such as a surface of the stator assembly 102 and/or a surface of the rotor 104.

Figure 3A:
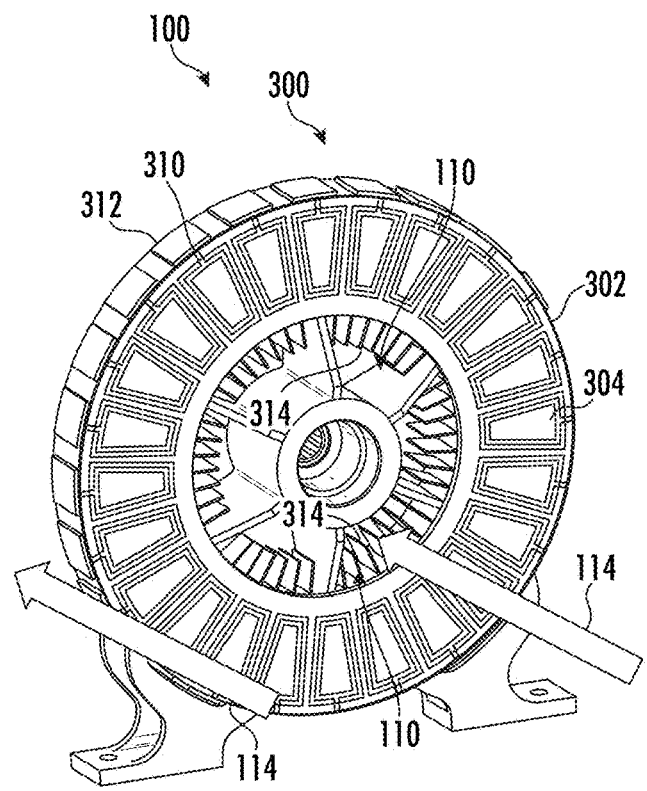
FIG. 3A schematically depicts an exemplary stator assembly of an electric machine.
Figure 3B:
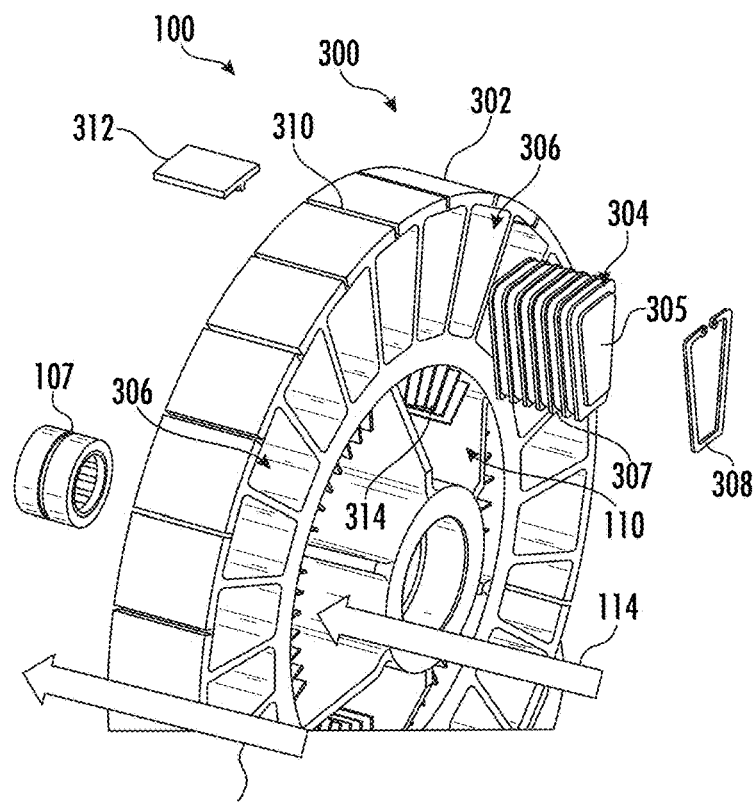
FIG. 3B schematically depicts an exploded view of an exemplary stator assembly of an electric machine.

FIGS. 3A and 3B show an exemplary stator assembly 102, 300 of an electric machine 100. The stator assembly 102, 300 may include a stator housing 302, and a plurality of electromagnetic elements 304 configured to fit within respective ones of a plurality of winding slots 306 of the stator housing 302. The electromagnetic element 304 may include a tooth 305, a winding material 307 wound around the tooth 305. By way of example, the winding material may include a plurality of wires, such as bundles of wires. In some embodiments, the bundles of wire may be housed in an insulating material (not shown). The electromagnetic elements 304 may be secured within the respective winding slots 306 by way of a tooth fitting 308, such as a snap ring, a retaining pin, a clamp plate, or the like. The stator housing 302 may include a plurality of eddy current path breaks 310 communicating with respective ones of the winding slots 306. The eddy current path breaks 310 interrupt eddy currents caused by magnetic flux from the electric machine. The eddy current path breaks 310 may be located at positions of the stator housing 302 that interrupt structural loops that may otherwise enhance eddy currents. The eddy current path breaks 310 may be disposed radially inward relative to a corresponding winding slot 306 and/or radially outward relative to a corresponding winding slot 306. The eddy current path breaks 310 may be configured to interrupt and/or prevent the formation of magnetic eddy current loops. A housing element 312 may be insertable within respective ones of the plurality of eddy current path breaks 310. The stator housing 302 may include a plurality of cooling fins 314 disposed about one or more stator cooling surfaces 110. The cooling fins 314 may be configured to help dissipate heat from the operative elements 200 of an electric machine 100. In some embodiments, the plurality of winding slots 306 of the stator housing 302 may be open to the rotor(s) 104. For example, in some embodiments the assembled electric machine may include electromagnetic elements 304 directly facing the rotor(s) 104 without a portion of the stator housing 302 disposed between them.

Figure 4B:
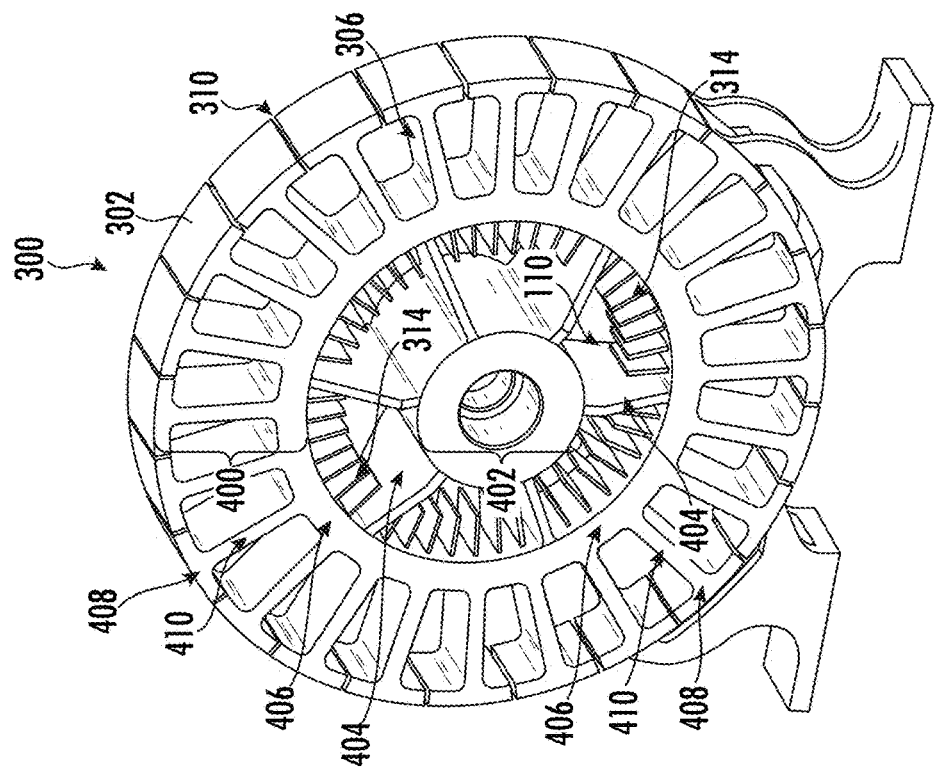
FIGS. 4A-4C schematically depict exemplary stator housings of a stator assembly.
Figure 4A:
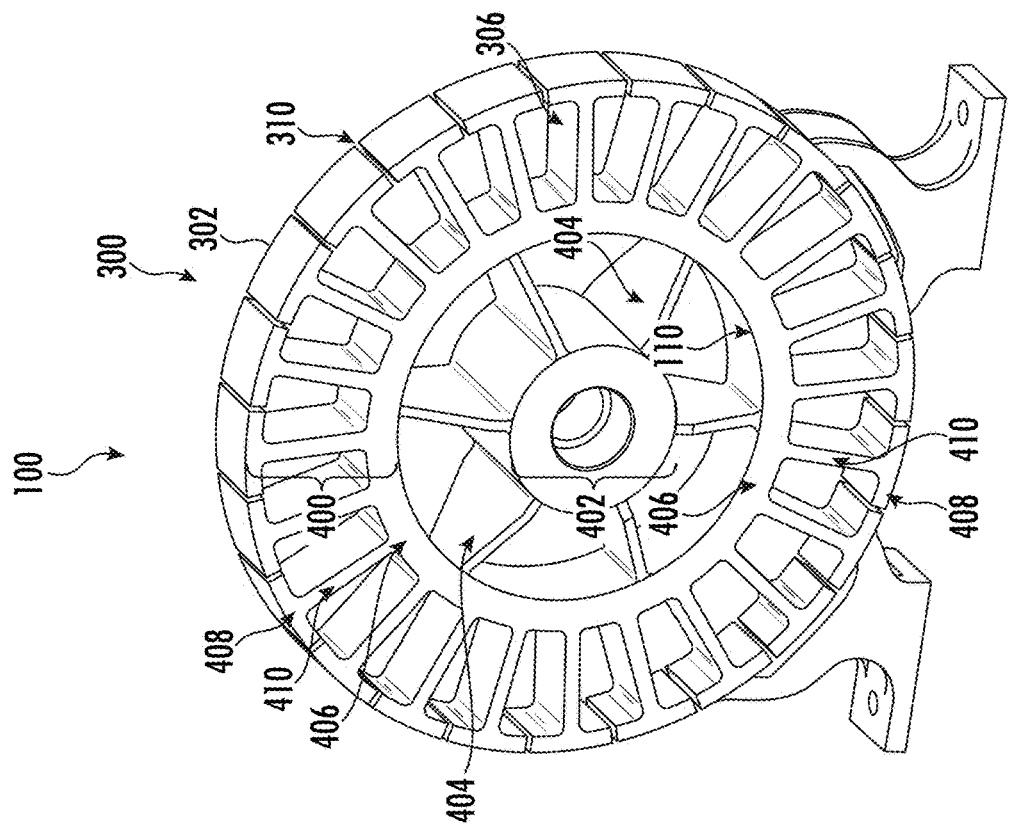
Figure 4C:
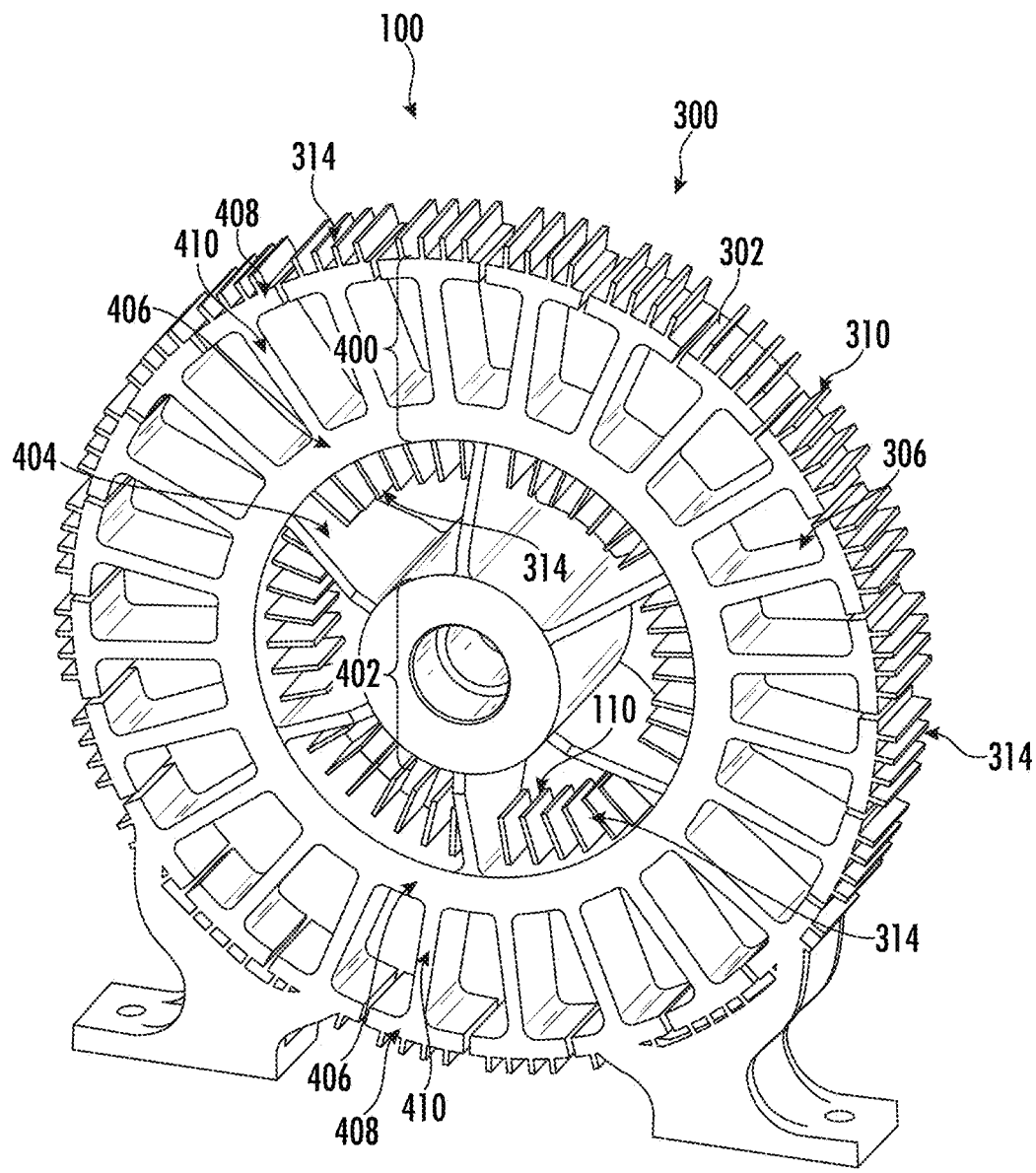

Exemplary stator housings 302 are show in FIGS. 4A-4C. A stator housing 302 may be formed using an additive manufacturing process, such as a powder bed fusion process as described herein. The stator housing 302 may include a winding annulus 400 that defines the plurality of winding slots 306 configured to receive the electromagnetic elements 304. The stator housing 302 may include a hub 402 configured to receive the rotor shaft assembly 106, such as by way of a rotor bearing assembly (FIG. 3B). The winding annulus 400 and the hub 402 may be secured to one another by a plurality of stator flanges 404. The stator flanges 404 may define at least some of the plurality of stator cooling surfaces 110. The winding annulus 400 may include an inward annular portion 406, an outward annular portion 408, and plurality of winding flanges 410 disposed between the inward annular portion 406 and the outward annular portion 408.

As shown in FIG. 4A, a stator housing 302 may be configured without cooling fins 314. As shown in FIG. 4B, a stator housing 302 may include a plurality of cooling fins 314 disposed about a radially inward portion of the stator housing 302. For example, the cooling fins 314 may be disposed about a radially inward portion of the winding annulus 400, such as an inward annular portion of the winding annulus 400. As shown in FIG. 4C, a stator housing may include a plurality of cooling fins 314 disposed about a radially outward portion of the stator housing 302. For example, the cooling fins 314 may be disposed about a radially outward portion of the winding annulus 400, such as an outward annular portion of the winding annulus 400. Additionally, or in the alternative, as shown in FIG. 4C, a stator housing 302 may include a plurality of cooling fins 314 disposed about a radially inward portion of the stator housing 302 and a radially outward portion of the stator housing 302. For example, a first plurality of cooling fins 314 may be disposed about a radially inward portion of the winding annulus 400, such as an inward annular portion of the winding annulus 400, and a second plurality of cooling fins 314 may be disposed about a radially outward portion of the winding annulus 400, such as an outward annular portion of the winding annulus 400.

The respective portions of the stator housing 302 may be integrally formed with one another, such as by additively manufacturing the respective portions of the stator housing 302 as a single integrated component. Additionally, or in the alternative, some of the portions of the stator housing 302 may be formed as a separate component, such as in a separate additive manufacturing operation, and such separate components may be fixed or secured to one another to form a complete stator housing 302.

Now turning to FIGS. 5A-5D, 6A-6C, 7A-7C, and 8A-8C, exemplary cooling structures 500 will be described. As shown, at least a portion of a stator housing 302 may include a cooling structure 500 disposed therein. For example, one or more cooling structures 500 may be disposed within at least a portion of a winding annulus 400. A cooling structure 500 may be disposed within at least a portion of an inward annular portion 406 of the winding annulus 400, at least a portion of an outward annular portion 408 of the winding annulus 400, and/or within at least a portion of one or more winding flanges 410. The cooling structure 500 may be disposed within at least a portion of one or more cooling fins 314. The cooling structure 500 may be configured to help transfer heat from the operative elements 200 of the electric machine 100 to the cooling fluid 114 flowing along the one or more cooling surfaces 108.

The cooling structure may be additively manufactured during the same additive manufacturing process used to form the stator housing 302. The cooling structure 500 may include a three-dimensional structure that defines a fluid domain. By way of example, the three-dimensional structure may define fluid domain that includes a plurality of tortuous pathways. The cooling structure 500 may include a hollow volume with an array of structural elements disposed therein, such as a lattice structure, a mesh structure, a wicking structure, an agglomerate structure, or the like. In some embodiments, the cooling structure 500 may include sintered powder material and/or partially melted powder material from the additive manufacturing process. At least a portion of the hollow volume of the cooling structure 500 may include a random or semi-random configuration of lattice, mesh, wicking, and/or agglomerate structures.

A working fluid may be disposed within and/or flow through the plurality of pathways defined by the cooling structure 500. The lattice, mesh, wicking, and/or agglomerate structures may be configured and arranged with a size that allows the working fluid to transport through the cooling structure 500 by way of capillary action. In some embodiments, the cooling structure 500 may define a vapor chamber 502. The vapor chamber 502 may include an internal wicking structure 504 and/or one or more vapor channels 506. In some embodiments, the cooling structure 500 may include a vapor chamber 502 with an evaporator portion 508 and a condenser portion 510.

The evaporator portion 508 and the condenser portion 510 may be disposed about a defined region of the cooling structure 500. Additionally, or in the alternative, the cooling structure 500 may include a vapor chamber 502 with an evaporator portion 508 and a condenser portion 510 that have a variable location that depends on one or more temperature gradients of the cooling structure 500 that may exist during operation of the electric machine 100. For example, a relatively hotter portion of the cooling structure 500 may operate as an evaporator portion 508 and a relatively cooler portion of the cooling structure 500 may operate as a condenser portion 510.

In some embodiments, the cooling structure 500 may include one or more evaporator portions 508 disposed about one or more of the winding flanges 410. Additionally, or in the alternative, the cooling structure 500 may include one or more condenser portions disposed about an inward annular portion 406 of the winding annulus 400 and/or disposed about an outward annular portion 408 of the winding annulus 400. In some embodiments, the cooling structure 500 may include one or more evaporator portions 508 about an inward annular portion 406 of the winding annulus 400 and/or disposed about an outward annular portion 408 of the winding annulus 400. Additionally, or in the alternative, the cooling structure 500 may include one or more condenser portions 510 disposed about one or more of the winding flanges 410. The winding flanges 410 may include one or more evaporator portions 508 and/or one or more condenser portions 510. The inward annular portion 406 of the winding annulus 400 may include one or more evaporator portions 508 and/or one or more condenser portions 510. The outward annular portion 408 of the winding annulus 400 may include one or more evaporator portions 508 and/or one or more condenser portions 510.

Figure 5A:
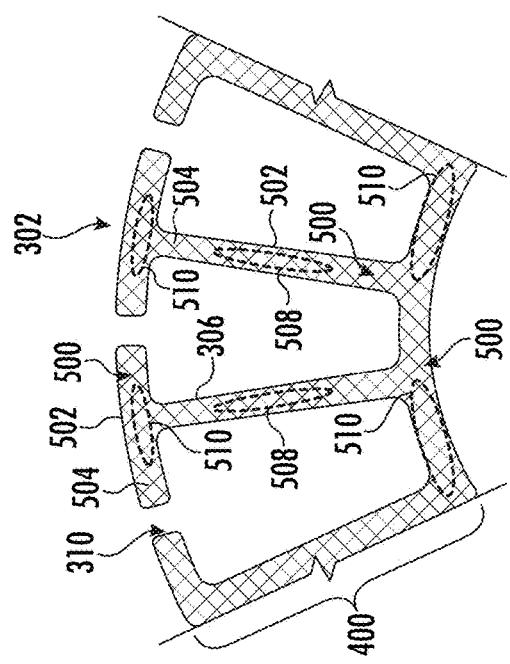
FIGS. 5A-5C schematically depict partial cross-sectional views of exemplary embodiments of a stator housing with a cooling structure disposed therein.
Figure 5B:
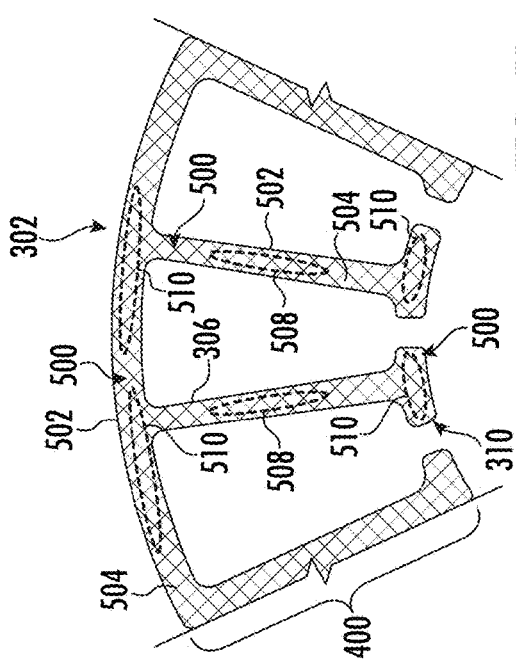
Figure 5C:
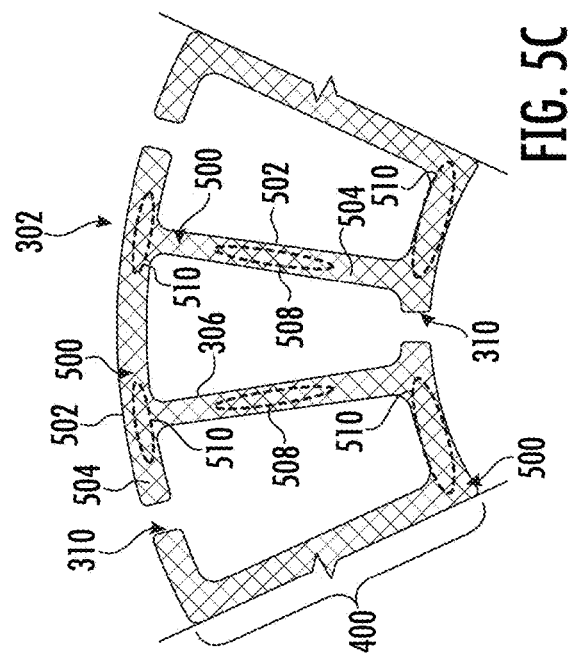

As shown, for example, in FIGS. 5A-5C, a cooling structure 500 may encompass substantially an entirety of a winding annulus 400. The cooling structure 500 shown in FIG. 5A may be configured as a vapor chamber 502. In some embodiments, the winding annulus 400 shown in FIGS. 5A-5C may include one or more evaporator portions 508 disposed about at least a portion of a plurality of winding flanges 410. The winding annulus 400 shown in FIGS. 5A-5C may include one or more condenser portions 510 disposed about at least part of an inward annular portion 406 of the winding annulus 400 and/or at least part of an outward annular portion 408 of the winding annulus 400. The particular locations of the evaporator portions 508 and/or condenser portions 510 of the cooling structure 500 may depend at least in part on one or more operating temperatures of the winding annulus 400, such as a temperature gradient within the winding annulus 400.

The winding annulus may include eddy current path breaks 310 disposed about an outward annular portion 408 of the winding annulus (e.g., FIG. 5A), an inward annular portion 406 of the winding annulus (e.g., FIG. 5B), or both an outward annular portion 408 and an inward annular portion 406 of the winding annulus (e.g., FIG. 5C). In some embodiments, the location of the one or more evaporator portions 508 and/or the one or more condenser portions 510 may depend at least in part on the location of the eddy current path breaks 310. For example, the one or more evaporator portions 508 may be disposed about a location of the cooling structure 500 relatively distal to a eddy current path break 310. Additionally, or in the alternative, one or more condenser portions 510 may be disposed about a location of the cooling structure 500 relatively proximal to a eddy current path break 310.

Figure 6A:
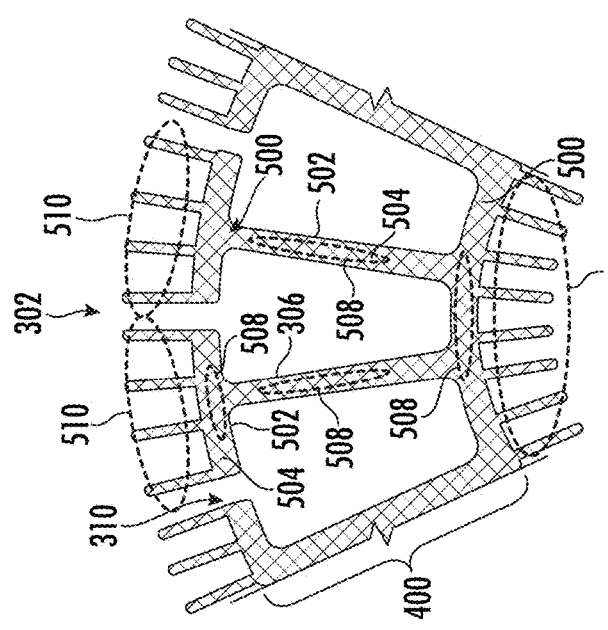
FIGS. 6A-6C schematically depict partial cross-sectional views of further exemplary embodiments of a stator housing with a cooling structure disposed therein.
Figure 6C:
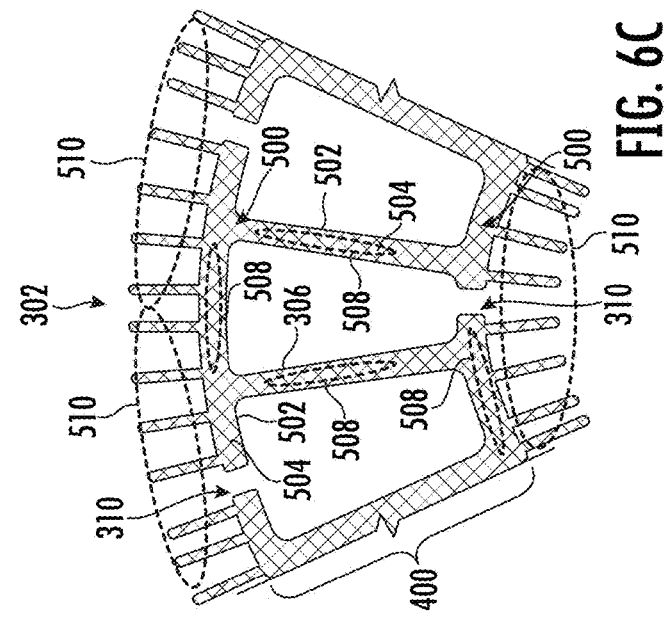
Figure 6B:
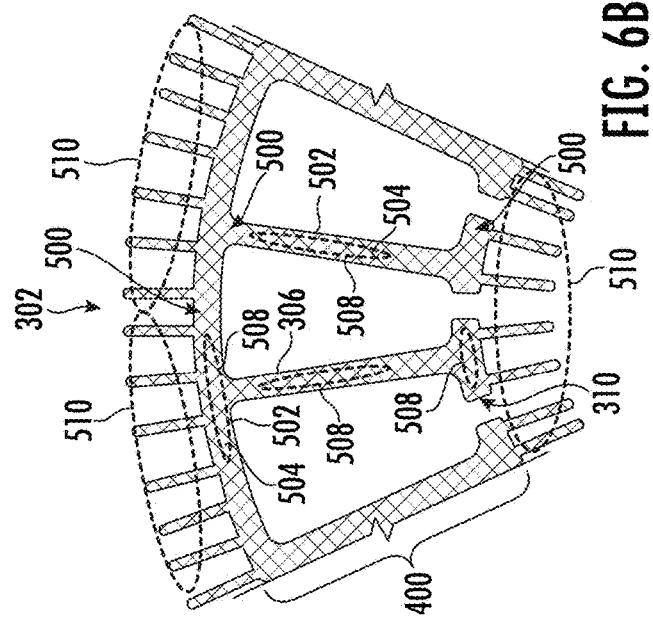

As shown in FIGS. 6A-6C, in some embodiments, the winding annulus 400 may include a plurality of cooling fins 314 disposed about an outward annular portion 408 of the winding annulus 400 and/or an inward annular portion 406 of the winding annulus 400. The cooling fins 314 may define at least a portion of the cooling structure 500. In some embodiments, the location of the one or more evaporator portions 508 and/or the one or more condenser portions 510 may depend at least in part on the location of the plurality of cooling fins 314. For example, the one or more evaporator portions 508 may be disposed about a location of the cooling structure 500 relatively distal to the plurality of cooling fins 314. Additionally, or in the alternative, one or more condenser portions 510 may be disposed about a location of the cooling structure 500 relatively proximal to the plurality of cooling fins 314. In some embodiments, the cooling fins may define a condenser portion 510 of the cooling structure 500.

Figure 7A:
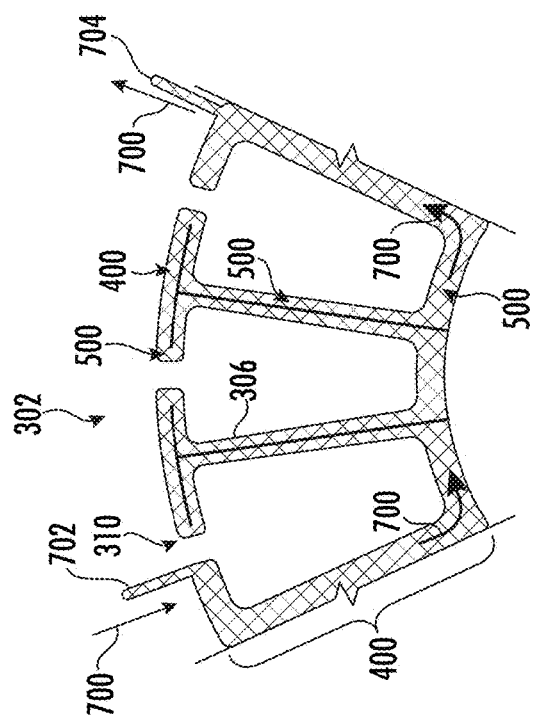
FIGS. 7A-7C schematically depict partial cross-sectional views of still further exemplary embodiments of a stator housing with a cooling structure disposed therein.
Figure 7C:
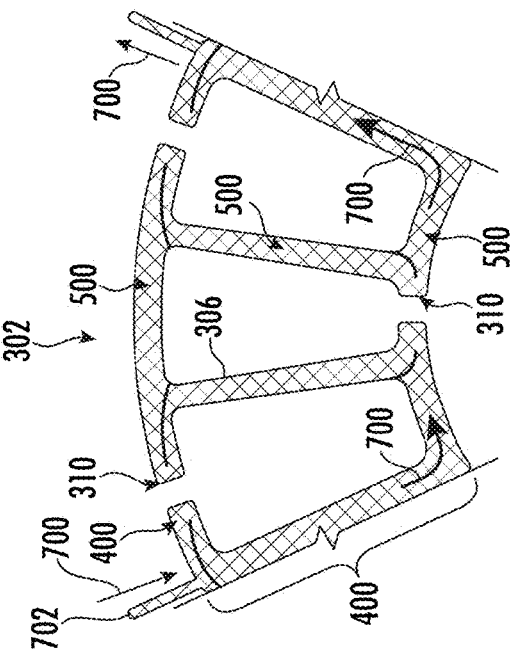
Figure 7B:
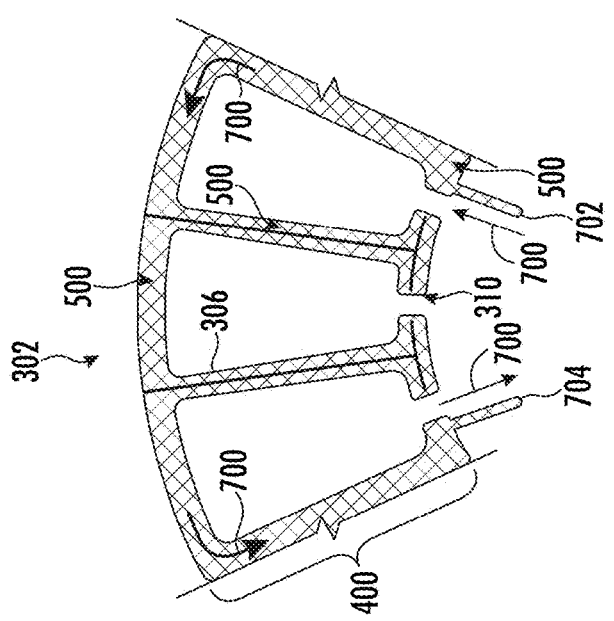

As shown in FIGS. 7A-7C, in some embodiments, a winding annulus 400 may include a cooling structure 500 that defines a flow path 700 configured to allow a working fluid to flow from an inlet 702 to an outlet 704. The flow path 700 may include a lattice structure or the like configured to cause the working fluid to follow a tortuous path between the inlet 702 and the outlet 704. In some embodiments, the cooling structure 500 may include one or more baffles 706 that define at least a portion of the flow path 700. The baffles 706 may be configured to direct the working fluid through along a serpentine pathway through the cooling structure 500. In some embodiments, one or more baffles 706 may be disposed within respective ones of the plurality of winding flanges 410. For example, one or more baffles 706 disposed within a winding flange 410 may be configured to define a flowpath extending through the winding flange 410 from an inward annular portion 406 of the winding annulus 400 to an outward annular portion 408 of the winding annulus 400, and then back through the winding flange 410 from the outward annular portion 408 to the inward annular portion 406 of the winding annulus 400. Additionally, or in the alternative, the one or more baffles 706 may be disposed within an outward annular portion 408 of the winding annulus 400 and/or within an inward annular portion of the winding annulus 400. For example, one or more baffles 706 disposed within an outward annular portion 408 may be configured to define a flowpath extending clockwise through the outward annular portion 408, and then back through the outward annular portion 408 in a counterclockwise direction, or vice versa, such as between adjacent eddy current path breaks 310. One or more baffles 706 disposed within an inward annular portion 406 may be configured to define a flowpath extending clockwise through the inward annular portion 406, and then back through the inward annular portion 406 in a counterclockwise direction, or vice versa, such as between adjacent eddy current path breaks 310.

It will be appreciated that the exemplary stator housings 302 shown in FIGS. 5A-5C, 6A-6C, and 7A-7C are provided by way of example only and are not intended to be limiting. In some embodiments, one or more of the features shown in FIGS. 5A-5C, 6A-6C, and/or 7A-7C, may be combined with one another to provide still further embodiments. For example, a stator housing 302 may include a cooling structure 500 that has both a vapor chamber 502 and a flow path 700 configured to allow a working fluid to flow from an inlet 702 to an outlet 704. The vapor chamber 502 and the flow path 700 may be provided as separate cooling structures 500, such as physically separate cooling structures 500 and/or fluidly separate cooling structures 500. Additionally, or in the alternative, the vapor chamber 502 and the flow path 700 may be provided as a single integrated cooling structure, such as with a vapor chamber 502 and a flow path 700 fluidly separated from one another and/or with a vapor chamber 502 and a flow path 700 fluidly communicating with one another.

Now referring to FIGS. 8A-8D, exemplary cooling structures 500 are further described. As shown, an exemplary cooling structure may include a cooling body 800 and a plurality of cooling conduits 802 defined at least in part by the cooling body 800. The cooling body 800 may include an array of structural elements, such as a lattice structure, a mesh structure, a wicking structure, an agglomerate structure, or the like. In some embodiments, the cooling body 800 may include an agglomerate structure that includes sintered powder material and/or partially melted powder material from the additive manufacturing process. At least a portion of the cooling body 800 may include a random or semi-random configuration of lattice, mesh, wicking, and/or agglomerate structures. The plurality of cooling conduits 802 may include a tortuous pathways for working fluid to flow through the cooling structure 500. In some embodiments, cooling structure 500 may include a vapor chamber 502. The vapor chamber 502 may include a cooling body 800 configured and arranged in the form of a wicking structure 504 that allows the working fluid to transport through the cooling structure 500 by way of capillary action. For example, the lattice, mesh, wicking, and/or agglomerate structures may be configured and arranged with a size that provides a wicking structure 504 that allows for capillary action. The vapor chamber 502 may include one or more of cooling conduits 802 configured and arranged in the form of one or more vapor channels 506.

Figure 8E:
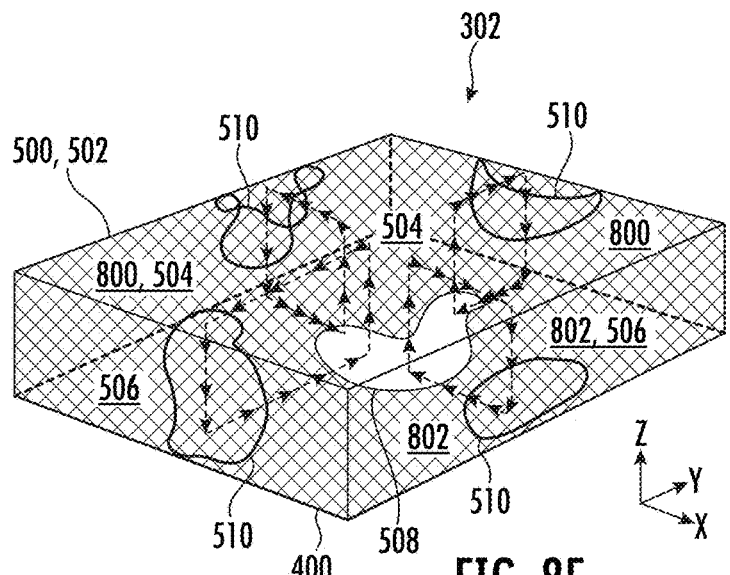

As shown in FIGS. 8A-8F, working fluid within a cooling structure 500 may evaporate at one or more evaporator portions 508. Evaporated working fluid may travel along a vapor path 808 through one or more of cooling conduits 802 and/or vapor channels 506 from an evaporator portion 508 to a condenser portion 510. The working fluid may condense at one or more condenser portions 510. Condensed working fluid may travel along a condensate path 810 through a cooling body 800 and/or wicking structure 504 from the condenser portion 510 to the evaporator portion 508. One or more cooling bodies 800 and/or one or more wicking structure 504 may be disposed about an external portion of the cooling structure 500 (FIGS. 8A and 8B). One or more cooling conduits 802 and/or one or more vapor channels 506 may be disposed about an internal portion of the cooling structure 500 (FIGS. 8A and 8B). Additionally, or in the alternative, one or more cooling conduits 802 and/or one or more vapor channels 506 may be disposed about an external portion of the cooling structure 500 (FIGS. 8C and 8D). One or more cooling bodies 800 and/or one or more wicking structure 504 may be disposed about an internal portion of the cooling structure 500 (FIGS. 8C and 8D).

Figure 8F:
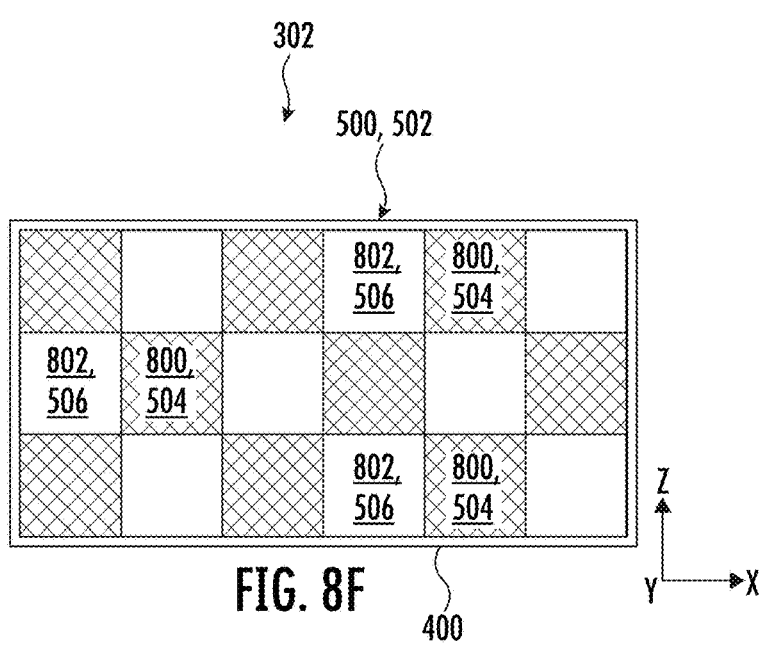
Figure 8G:
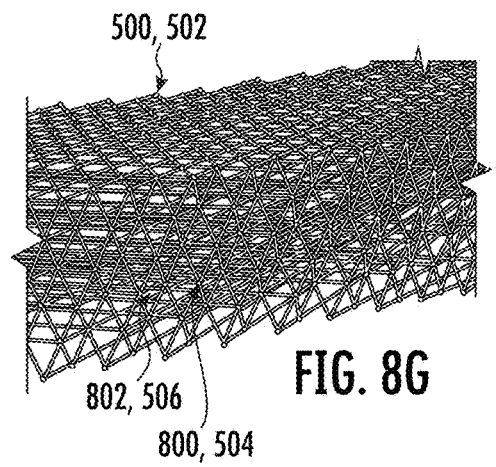

As shown in FIGS. 8E-8G, a cooling structure 500 and/or a vapor chamber 502 may be configured in the form of a three-dimensional array of cooling body 800 portions and cooling conduit 802 portions interspersed with one another, such as a three dimensional array of wicking structures 504 and vapor channels 506. For example, a three-dimensional array of cooling bodies 800 and/or wicking structures 504 may define a three-dimensional furcated pathway of cooling conduits 802 and/or vapor channels 506. A three-dimensional cooling structure 500 and/or vapor chamber 502, such as those shown in FIGS. 8E-8G may include one or more evaporator portions 508 and/or one or more condenser portions 510 located variably within the vapor chamber 502, for example, based at least in part on a temperature and/or a temperature gradient of the cooling structure 500. For example, when a portion of the cooling structure 500 exceeds a threshold temperature, working fluid located proximal thereto may evaporate and travel through the cooling conduit 802 and/or vapor channels 506. The evaporated working fluid may condense at a portion of the cooling structure that is below a threshold temperature, and then travel through the cooling body portion and/or wicking structures by way of capillary action until eventually reaching another portion of the cooling structure 500 that exceeds a threshold temperature. The specific locations of the one or more evaporator portions 508 and/or one or more condenser portions 510 may change during operation of an electric machine 100, such as under different operating conditions and/or as different portions of the cooling structure 500 discharge heat to the cooling fluid 114 flowing along the one or more cooling surfaces 108 of the stator housing 302, such as the one or more stator cooling surfaces 110.

Figure 9A:
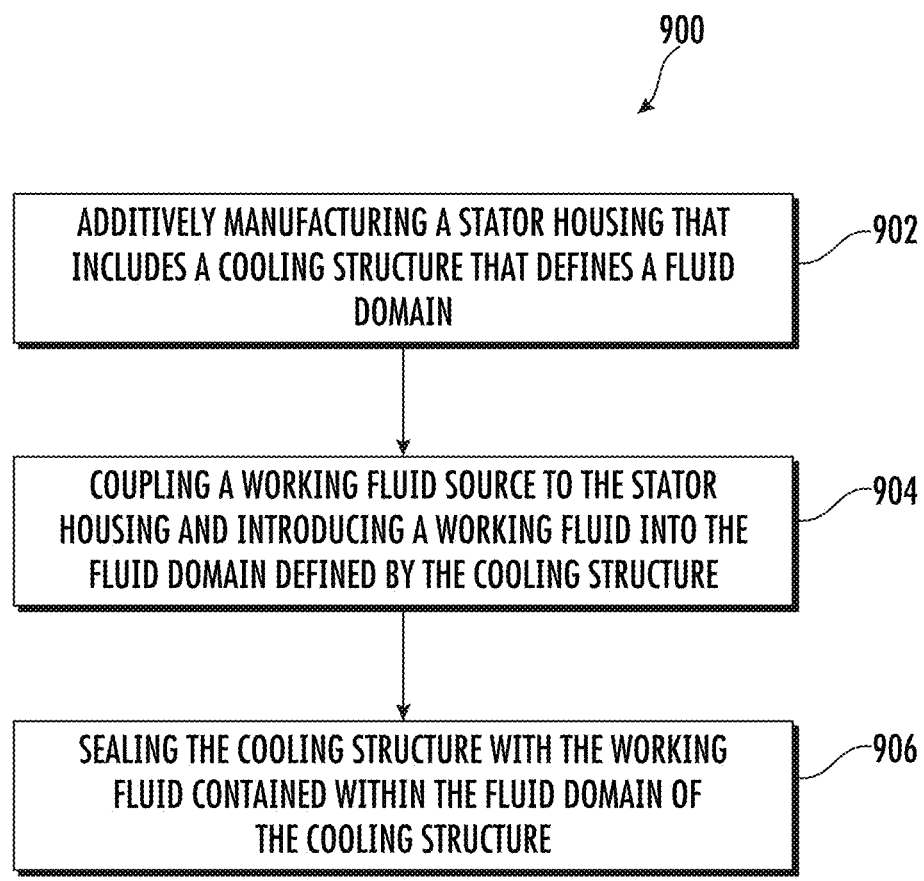
FIG. 9A shows a flow chart depicting an exemplary method of manufacturing a stator housing that includes a cooling structure.

Now turning to FIGS. 9A and 9B, exemplary methods 900 of forming a stator housing 302 for an electric machine 100 will be described. A stator housing 302 may be formed using an additive manufacturing process, such as a powder bed fusion process. As used herein, the term "additive manufacturing" refers generally to manufacturing technology in which components are manufactured in a layer-by-layer manner. An stator housing 302 may be formed using any desired additive manufacturing technology. In an exemplary embodiment, a stator housing 302 may be formed using an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature, and may have a variety of integral sub-components.

Additionally or alternatively suitable additive manufacturing technologies include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Sterolithography (SLA) technology, and other additive manufacturing technology that utilizes an energy beam. Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable build material. For example, the build material may be a metal, a ceramic, or any other suitable build material. In exemplary embodiments, the build material may be selected from among non-magnetic or weakly magnetic metals or metal alloys, such as titanium or titanium alloys, aluminum or aluminum alloys. Additionally, or in the alternative, the build material may be selected from metal or metal alloys that have low electrical conductivity. Advantageously, such non-magnetic or weakly magnetic metals or metal alloys (and/or low electrical conductivity metals or metal alloys) may exhibit a relatively low Lenz Effect during operation of the electric machine 100. Such materials may sometimes be referred to as "non-participating" materials because the materials generally do not participate in generating the electromagnetic force provided by the electric machine 100. The additive manufacturing process may utilize a build material in any suitable form, including a solid, liquid, powder, sheet, wire, or any other suitable form.

Figure 9B:
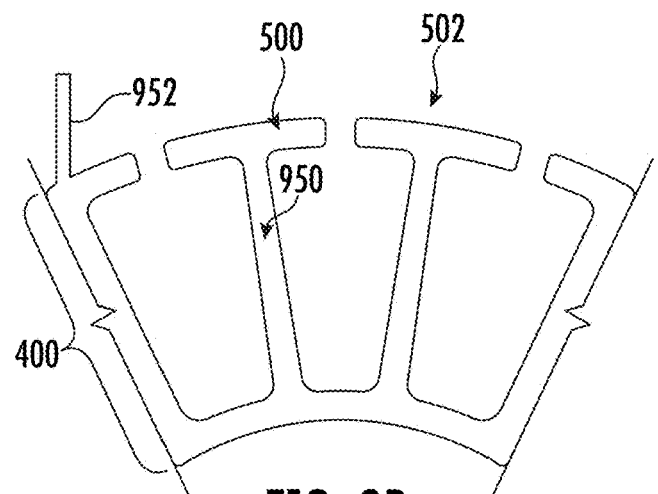
FIGS. 9B-9D schematically depict a stator housing having a working fluid introduced into a fluid domain defined by a cooling structure of the stator housing.
Figure 9C:
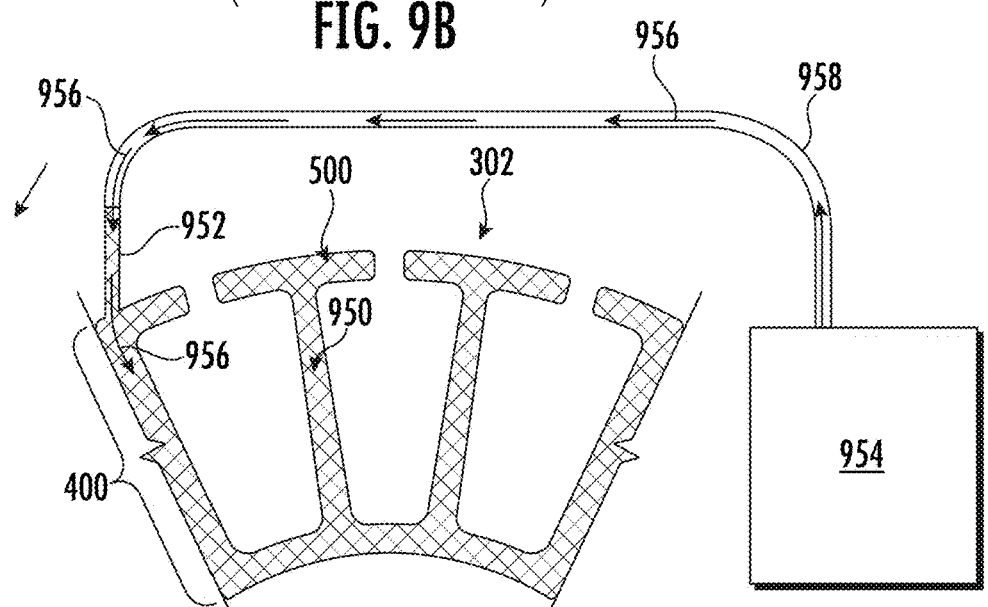
Figure 9D:
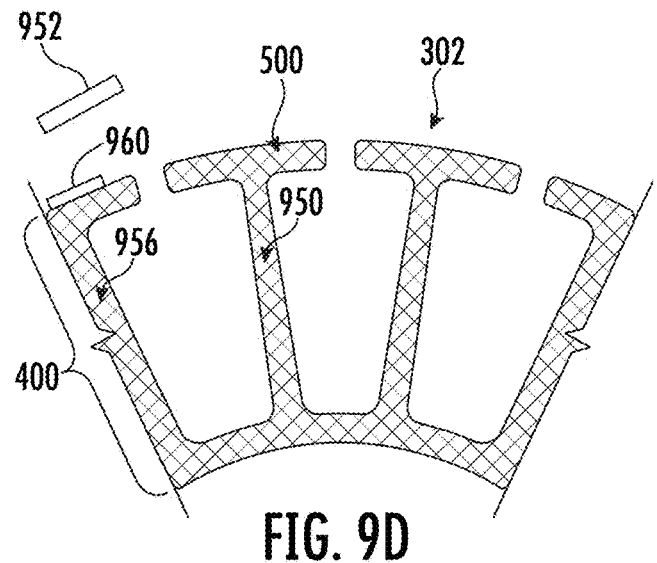

Referring still to FIGS. 9A-9D, an exemplary method 900 may include, at block 902, additively manufacturing a stator housing 302 that includes a cooling structure 500 that defines a fluid domain 950 (FIG. 9B). The stator housing 302 may include a working fluid supply port 952 providing fluid communication between a working fluid source 954 and the fluid domain 950 defined by the cooling structure 500 (FIG. 9C). An exemplary method 900 may include, at block 904, coupling a working fluid source 954 to the stator housing 302 and introducing a working fluid 956 into the fluid domain 950 defined by the cooling structure 500 (FIG. 9C). By way of example, the working fluid source 954 may be coupled to the working fluid supply port 952 of the stator housing 302, such as by way of a supply hose 958 or the like. An exemplary method 900 may include, at block 906, sealing the cooling structure 500 with the working fluid 956 contained within the fluid domain 950 of the cooling structure 500.

In some embodiments, the fluid domain 950 may be sealed with a patch 960 such as by adding molten material to the stator housing 302 to the portion of the cooling structure having the working fluid supply port 952. At least a portion of the fluid supply port 952 may be removed when sealing the cooling structure 500. The fluid domain 950 may be sealed under vacuum at a pressure level suitable to allow the fluid domain to operate as a vapor chamber 502, such that working fluid may evaporate and condense at desired temperatures corresponding, for example, to intended operating conditions of the electric machine 100. For example, the working fluid 956 may be heated to a suitable temperature, such as a boiling temperature, thereby purging non-condensing gases from the fluid domain 950 and/or vapor chamber 502. The vapor chamber 502 may then be sealed with the working fluid 956 at a heated state, such as while sustaining such heated conditions. The vacuum may be provided by the working fluid 956 being allowed to cool. Any suitable working fluid 956 may be selected. Suitable working fluids include those with a relatively high latent heat, relatively high surface tension, relatively high thermal conductivity, and a suitable boiling point commensurate with the intended operating conditions of the electric machine 100.

Figure 10:
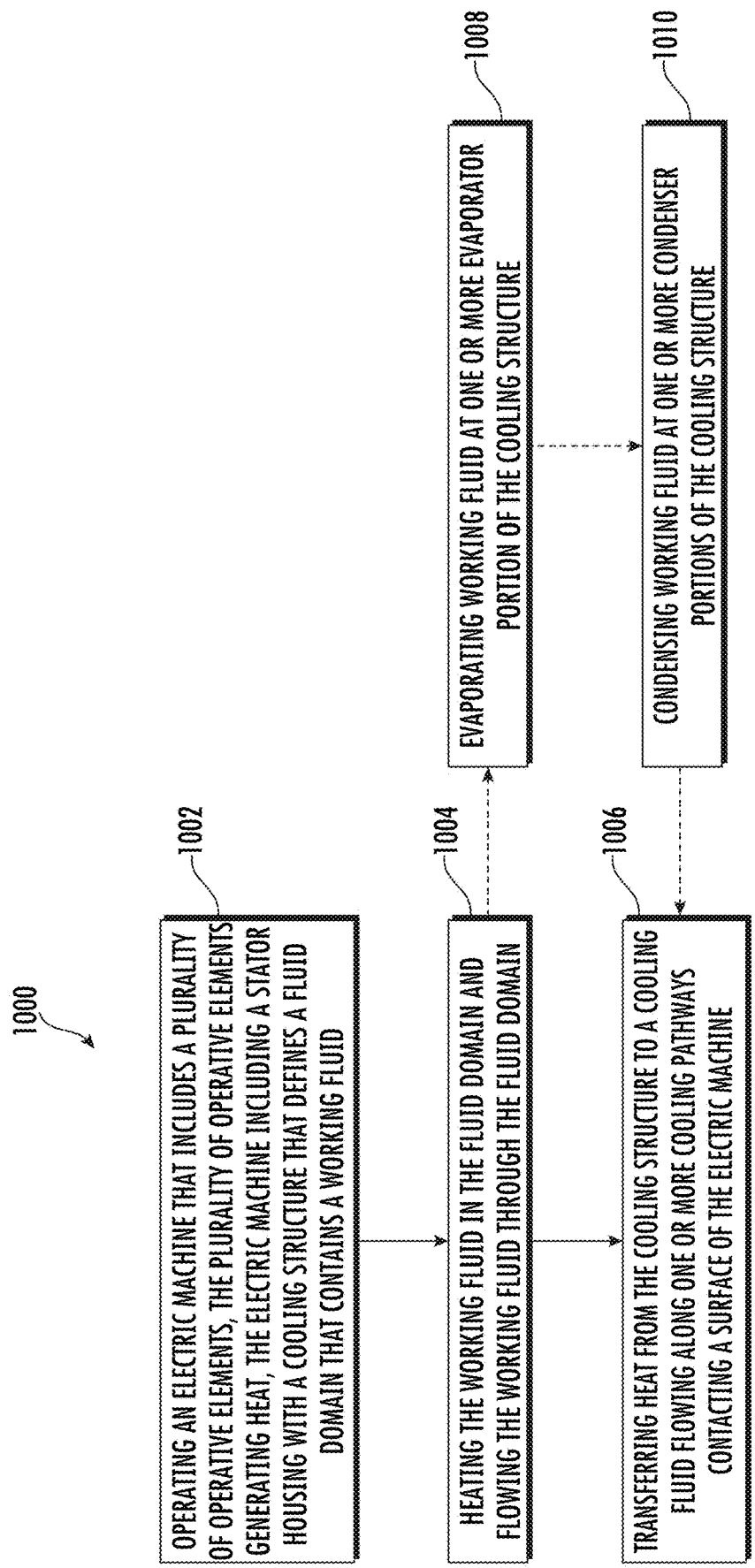
FIG. 10 shows a flow chart depicting an exemplary method of cooling an electric machine.

Now turning to FIG. 10, an exemplary method 1000 of cooling an electric machine will be described. An exemplary method 1000 may include, at block 1002, operating an electric machine 100 that includes a plurality of operative elements 200 generating heat. The electric machine 100 may include a stator housing 302 with a cooling structure 500 that defines a fluid domain 950 that contains a working fluid 956. The cooling structure 500 may include a vapor chamber 502. An exemplary method 1000 may include, at block 1004, heating the working fluid 956 and flowing the working fluid 956 through the fluid domain 950. The fluid domain 950 may include a plurality of cooling conduits 802 such as a plurality of vapor channels 506. An exemplary method 1000 may include, at block 1006, transferring heat from the cooling structure 500 to a cooling fluid 114 flowing along the one or more cooling surfaces 108, such as one or more stator cooling surfaces 110 and/or one or more rotor cooling surfaces 112, contacting a surface of the electric machine 100, such as a surface of the stator assembly 102 and/or a surface of the rotor 104. For example, the one or more cooling surfaces 108, such as one or more stator cooling surfaces 110 may provide cooling fluid 114 contacting a surface of the stator housing 302, such as a surface of the stator housing 302 that includes a plurality of cooling fins 314. The one or more cooling surfaces 108 may be disposed about a radially inward portion of the electric machine 100, as shown, for example, in FIGS. 1A and 1B. Additionally, or in the alternative, the one or more cooling surfaces 108 may be disposed about a radially outward portion of the electric machine 100.

The cooling structure 500 may include a vapor chamber 502. An exemplary method 1000 may include, at block 1008, evaporating working fluid 956 at one or more evaporator portion 508 of the cooling structure 500, such as at one or more evaporator portions 508 of the vapor chamber 502. At block 1010, an exemplary method 1000 may include condensing working fluid 956 at one or more condenser portions 510 of the cooling structure 500, such as at one or more condenser portions 510 of the vapor chamber 502. When the working fluid 956 evaporates, the latent heat of vaporization absorbed by the working fluid cools the evaporator portion 508 of the cooling structure. The evaporating working fluid 956 increases the vapor pressure, which drives mass transfer from the evaporator portion 508 of the vapor chamber 502 to the condenser portion 510 of the vapor chamber 502. When the working fluid 956 condenses, latent heat is released from the working fluid 956, In some embodiments, the one or more evaporator portions 508 and/or the one or more condenser portions 510 may be located variably within the vapor chamber 502, for example, based at least in part on a temperature and/or a temperature gradient of the cooling structure 500.

Further aspects of the invention are provided by the subject matter of the following clauses:

1. An electric machine, comprising: a stator assembly comprising a stator housing; and one or more rotors coupled to the stator by a rotor shaft assembly; wherein the stator housing comprises a cooling structure, the cooling structure comprising a plurality of cooling body portions and a plurality of cooling conduits defined by the plurality of cooling body portions.
2. The electric machine of any clause herein, wherein the stator housing comprises a winding annulus defining a plurality of winding slots respectively configured to receive an electromagnetic element, and a cooling structure disposed within at least a portion of the winding annulus.
3. The electric machine of any clause herein, wherein the stator housing comprises: a winding annulus defining a plurality of winding slots respectively configured to receive an electromagnetic element, and at least a portion of the cooling structure being disposed within at least a portion of the winding annulus.
4. The electric machine of any clause herein, wherein the stator housing comprises: a plurality of cooling fins, and at least a portion of the cooling structure being disposed within at least a portion of the plurality of cooling fins.
5. The electric machine of any clause herein, wherein the cooling structure comprises: a vapor chamber, the vapor chamber comprising an internal wicking structure and one or more vapor channels.
6. The electric machine of any clause herein, wherein the cooling structure comprises: one or more evaporator portions and one or more condenser portions.
7. The electric machine of any clause herein, wherein the winding annulus comprises: an inward annular portion, an outward annular portion, and plurality of winding flanges disposed between the inward annular portion and the outward annular portion; and wherein the cooling structure comprises: one or more evaporator portions and one or more condenser portions, wherein the one or more evaporator portions are disposed about the plurality of winding flanges, and wherein the one or more condenser portions are disposed about the inward annular portion and/or the outward annular portion.
8. The electric machine of any clause herein, wherein the winding annulus comprises a plurality of cooling fins, and wherein the cooling structure comprises: one or more evaporator portions disposed about a location of the cooling structure relatively distal to the plurality of cooling fins; and one or more condenser portions disposed about a location of the cooling structure relatively proximal to the plurality of cooling fins.
9. The electric machine of any clause herein, wherein the plurality of cooling fins define at least part of the one or more condenser portions of the cooling structure.
10. The electric machine of any clause herein, wherein the cooling structure comprises: one or more evaporator portions and one or more condenser portions, wherein the one or more evaporator portion and/or the one or more condenser portions have a variable location that depends at least in part on one or more temperature gradients of the cooling structure that may exist during operation of the electric machine.
11. The electric machine of any clause herein, wherein the cooling structure defines a flowpath configured to allow a working fluid to flow from an inlet to an outlet.
12. The electric machine of any clause herein, wherein the cooling structure comprises a lattice structure, a mesh structure, a wicking structure, and/or an agglomerate structure.
13. The electric machine of any clause herein, wherein the cooling structure comprises an agglomerate structure, the agglomerate structure comprising sintered powder material and/or partially melted powder material from an additive manufacturing process used to form the stator housing.
14. The electric machine of any clause herein, wherein the cooling structure comprises a vapor chamber, the vapor chamber comprising a wicking structure and one or more vapor channels.
15. The electric machine of any clause herein, wherein the cooling structure comprises a three-dimensional array of cooling body portions and cooling conduit portions interspersed with one another.
16. The electric machine of any clause herein, wherein the cooling structure comprises a random or semi-random configuration of lattice, mesh, wicking, and/or agglomerate structures.
17. The electric machine of any clause herein, wherein the stator housing comprises a single integrated component formed by an additive manufacturing process.
18. A method of forming a stator housing for an electric machine, the method comprising: additively manufacturing a stator housing that includes a cooling structure, the cooling structure defining a fluid domain; coupling a heat transfer fluid source to the stator housing and introducing a working fluid into the fluid domain defined by the cooling structure; and sealing the cooling structure with the working fluid contained within the fluid domain of the cooling structure.
19. The method of any clause herein, wherein the stator housing comprises a winding annulus defining a plurality of winding slots respectively configured to receive an electromagnetic element, and a cooling structure disposed within at least a portion of the winding annulus, wherein the cooling structure comprising a plurality of cooling body portions and a plurality of cooling conduits defined by the plurality of cooling body portions
20. The electric machine of any clause herein, wherein the stator housing comprises a single integrated component.
21. The method of any clause herein, comprising: heating the working fluid and purging non-condensing gases from the fluid domain; and sealing the cooling structure with the working fluid at a heated state.
22. The method of any clause herein, wherein the electric machine is configured according to any clause herein.
23. A method of cooling an electric machine, the method comprising: operating an electric machine that includes a plurality of operative elements, the plurality of operative elements generating heat, the electric machine including a stator housing with a cooling structure that defines a fluid domain that contains a working fluid; heating the working fluid in the fluid domain and flowing the working fluid through the fluid domain; and transferring heat from the cooling structure to a cooling fluid flowing along one or more cooling surfaces contacting a surface of the electric machine.

24. The method of any clause herein, wherein the electric machine comprises a stator assembly, one or more rotors, a rotor shaft assembly coupling the one or more rotors to the stator assembly, and a plurality of operative elements comprising a plurality of electromagnetic elements, wherein the stator assembly comprises a stator housing, the stator housing comprising a winding annulus defining a plurality of winding slots respectively housing corresponding ones of the plurality of electromagnetic elements, and a cooling structure disposed within at least a portion of the winding annulus, wherein the cooling structure comprising a plurality of cooling body portions and a plurality of cooling conduits defined by the plurality of cooling body portions, wherein the plurality of cooling conduits define a fluid domain containing a working fluid, and wherein operating the electric machine comprises the plurality of operative elements generating heat.

25. The method of any clause herein, comprising: heating the working fluid in the fluid domain at least in part by the plurality of operative elements generating heat, and flowing the working fluid through the fluid domain.

26. The method of any clause herein, comprising: evaporating working fluid at one or more evaporator portion of the cooling structure; and condensing working fluid at one or more condenser portions of the cooling structure.

22. The method of any clause herein, wherein the electric machine is configured according to any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a stator housing for an electric machine, the method comprising:
   additively manufacturing a stator housing that includes a cooling structure, the cooling structure defining a fluid domain;
   coupling a working fluid source to the stator housing and introducing a working fluid into the fluid domain defined by the cooling structure; and
   sealing the cooling structure with the working fluid contained within the fluid domain of the cooling structure;
   wherein the stator housing comprises a winding annulus defining a plurality of winding slots respectively configured to receive an electromagnetic element, and the cooling structure disposed within at least a portion of the winding annulus, wherein the cooling structure comprising a plurality of cooling body portions and a plurality of cooling conduits defined by the plurality of cooling body portions.

2. The method of claim 1, wherein the stator housing comprises a single integrated component.

3. The method of claim 1, comprising:
   heating the working fluid and purging non-condensing gases from the fluid domain; and
   sealing the cooling structure with the working fluid at a heated state.

4. The method of claim 1, wherein the cooling structure is spaced from the electromagnetic element.

5. The method of claim 1, wherein sealing the cooling structure further comprises adding molten material to the cooling structure.

6. The method of claim 1, wherein the plurality of cooling conduits includes at least one vapor channel.

7. The method of claim 1, wherein sealing the cooling structure further comprises sealing the cooling structure under a vacuum.

8. The method of claim 1, wherein the cooling structure further comprises a working fluid supply port, and wherein sealing the cooling structure further comprises sealing a portion of the cooling structure that includes the working fluid supply port.

9. The method of claim 1, wherein the winding annulus comprises a plurality of cooling fins, and wherein the cooling structure comprises:
   one or more evaporator portions disposed about a location of the cooling structure relatively distal to the plurality of cooling fins; and
   one or more condenser portions disposed about a location of the cooling structure relatively proximal to the plurality of cooling fins.

10. The method of claim 9, wherein the plurality of cooling fins define at least part of the one or more condenser portions of the cooling structure.

11. The method of claim 1, wherein the cooling structure further comprises a three-dimensional structure that defines the fluid domain.

12. The method of claim 1, wherein the cooling structure is configured as a three-dimensional array of the plurality of cooling body portions.

13. The method of claim 1, wherein the stator housing further comprises at least one eddy current path break that communicates with at least one of the plurality of winding slots.

14. The method of claim 1, wherein the cooling structure comprises:
   one or more evaporator portions and one or more condenser portions, wherein the one or more evaporator portion or the one or more condenser portions are configured to be disposed in a location based at least in part on one or more temperature gradients of the cooling structure that may exist during operation of the electric machine.

15. The method of claim 1, wherein additively manufacturing the stator housing further comprises additively manufacturing an agglomerate structure of the cooling structure, the agglomerate structure comprising sintered powder material or partially melted powder material.

16. The method of claim 1, wherein additively manufacturing the stator housing further comprises additively manufacturing a random or semi-random configuration of lattice, mesh, wicking, or agglomerate structures in the cooling structure.

17. The method of claim 1, wherein the winding annulus comprises:
   an inward annular portion, an outward annular portion, and plurality of winding flanges disposed between the inward annular portion and the outward annular portion.

18. The method of claim 17, wherein the stator housing includes a plurality of cooling fins disposed on at least one of the inward annular portion or the outward annular portion.

19. The method of claim 17, wherein the plurality of winding flanges define a flowpath from the inward annular portion to the outward annular portion.

20. The method of claim 17, wherein the stator housing further comprises one or more baffles disposed within at least one of the plurality of winding flanges.

\* \* \* \* \*